United States Patent
Volozhanin

(10) Patent No.: US 10,665,212 B2
(45) Date of Patent: May 26, 2020

(54) STRING BOW PRACTICING AID

(71) Applicant: Feliks Volozhanin, Fullerton, CA (US)

(72) Inventor: Feliks Volozhanin, Fullerton, CA (US)

(*) Notice: Subject to any disclaimer, the term of this patent is extended or adjusted under 35 U.S.C. 154(b) by 0 days.

(21) Appl. No.: 16/291,315

(22) Filed: Mar. 4, 2019

(65) Prior Publication Data

US 2019/0333484 A1    Oct. 31, 2019

Related U.S. Application Data

(60) Provisional application No. 62/664,115, filed on Apr. 28, 2018.

(51) Int. Cl.
| | | |
|---|---|---|
| *G10D 3/16* | (2020.01) | |
| *G10D 3/166* | (2020.01) | |
| *G09B 15/00* | (2006.01) | |

(52) U.S. Cl.
CPC .............. *G10D 3/166* (2013.01); *G09B 15/00* (2013.01)

(58) Field of Classification Search
CPC .. G10H 3/18; G10H 1/00; G10H 1/32; G10H 2220/161; G10H 2220/365; G10H 3/00; E05D 7/00; E05D 11/10; E05D 11/1028; E05D 15/0634; E05D 15/0652
See application file for complete search history.

(56) References Cited

U.S. PATENT DOCUMENTS

| | | | | | |
|---|---|---|---|---|---|
| 2,239,579 | A | * | 4/1941 | Solodar ................. | G09B 15/06 84/283 |
| 5,331,111 | A | * | 7/1994 | O'Connell ............. | G09B 15/04 84/477 R |
| 5,355,757 | A | * | 10/1994 | Plummer ............... | G09B 15/06 84/283 |
| 5,670,727 | A | * | 9/1997 | Xiao ...................... | G09B 15/06 84/283 |
| 7,131,615 | B1 | * | 11/2006 | Bruce ................... | A47B 19/002 248/127 |
| 7,176,366 | B1 | * | 2/2007 | Bruce .................... | A47B 81/00 84/327 |
| 7,968,777 | B1 | * | 6/2011 | Davis ..................... | G09B 15/06 84/267 |
| 2012/0285313 | A1 | * | 11/2012 | Bisheimer ............... | G10D 3/00 84/298 |
| 2015/0122109 | A1 | * | 5/2015 | Hsu ......................... | G09B 15/06 84/465 |

\* cited by examiner

*Primary Examiner* — Marlon T Fletcher

(57) ABSTRACT

In embodiments, the invention includes a device for supporting motion of a bow with respect to a bowed string instrument such that motion of the bow is constrained to approximate good playing form. An embodiment includes a clamp for attaching the device to a bowed string instrument, a hinge, and a guide tube. The invention also includes a method using the device, wherein a student learning to play a bowed string instrument may develop good playing form and create a muscle memory associated with such good playing form.

20 Claims, 7 Drawing Sheets

STRING BOW PRACTICING AID

CROSS-REFERENCE TO RELATED APPLICATIONS

This application claims priority to U.S. Provisional application 62/664,115 filed Apr. 28, 2018, the contents of which are hereby incorporated by reference.

STATEMENT REGARDING FEDERALLY SPONSORED RESEARCH OR DEVELOPMENT

Not Applicable.

BACKGROUND OF THE INVENTION

Field of the Invention

This invention is in the field of aids for developing skills for bowed string instruments.

Learning to play a bowed string instrument, such a violin, viola, cello, or double bass, requires extensive bowing practice to train a muscle memory. Unfortunately, it is easy for a novice to bow incorrectly creating bad habits, which must be undone if the student is to progress. Practice under the watchful eye of a skilled instructor to keep correct form uses expensive instruction time for repetitive action. It would be desirable for a student to practice without an instructor to develop the needed muscle memory if the student could practice correctly. There is thus a need for a training device that helps a student maintain proper bowing form without continuous instructor supervision.

Several references describe devices that purport to provide this function. However, such devices either do not sufficiently constrain the student's bowing to the required form or do not allow the student to practice the full range of motions required.

For example, U.S. Pat. No. 2,782,670 to Lipski describes a training attachment for stringed instruments made of a pair of U-shaped guides connected to a pair of parallel side clips for attachment to the bridge and finger board of a stringed instrument. This sets up two parallel fences across the strings: the student is compelled to move the bow at right angles between the guides. Nothing constrains the height of the bow to maintain consistent contact with the strings. This is a problem because consistent string contact is an important part of bow practice and muscle memory.

A commercially advertised device known as the Arm Bow Corrector attributed on the website arm-bow-corrector.com to Christof Henkel includes similar parallel fences to the Lipski disclosure, though this "ABC" device couples to a fingerboard through a simpler spring action. Like the Lipski device, nothing constrains the height of the bow to maintain consistent contact with the strings. The ABC device also limits bow access because its construction keeps the ends of the bow away from the strings. This prevents use of the full bow length, especially, at the frog. It is crucial to start down bow movement as close to the bow frog as possible because this teaches students to fold their wrist and elbow properly. Students trained on devices such as the ABC tend to use just the middle portion of the bow. There is thus a need for a bow restraining device that allows unhindered access for the entire stroke of the bow.

U.S. Pat. No. 5,670,727 to Xiao describes a stringed instrument standalone practice bow guide without strings used for practice in place of an actual instrument. A tubular bow track is pivotally secured to a frame so that the bow passage is in a fixed, right-angle relationship with respect to a longitudinal axis of the board and adjustably pivots with respect to a transverse axis of the board. In use, the bow track is fixed at one of several angles (each considered appropriate for one string) and the student moves the bow back and forth at the fixed angle. The bow guide is thus held at a fixed angle with respect to the board. The bow guide cannot move between string positions without readjusting the bow guide angle, and no provision is available for practicing legato (when two strings are bowed simultaneously). There is a need for a bow guide that can be used for different string positions "on the fly". Also, the bow of a string instrument is under tension: the distance between the stick and the hair of the bow varies. The stick is relatively close to the hair near the center of the bow and relatively far from the hair near the ends of the bow. The Xiao device keeps a constant distance between the bow stick retained in the tubular bow track and where the strings would be if the Xiao device had strings. There is thus a need for a practice device that maintains the bow hair in contact with the strings independently of bow position.

Proper bow arm technique is quite complex for bowed string instruments. While various beginner programs tout the importance of bowing perpendicularly to the fingerboard, correct bow technique requires angles of 30-45 degrees and use of nearly the full bow length for developing proper bow arm technique. None of the prior art devices support this. There is therefore a need for a practice device that supports each of these requirements.

SUMMARY

In embodiments, the invention includes a device for supporting a bow with respect to a bowed string instrument.

In other embodiments, the invention includes a method of supporting motion of a bow with respect to a bowed string instrument such that motion of the bow is constrained to approximate good playing form. Using the method, a student learning to play a bowed string instrument may develop good playing form and create a muscle memory associated with such good playing form.

In embodiments, the invention includes a device having a clamp including an upper surface, an elongated post extending upward from the upper surface, a hinge member pivotably connected to the post, and a guide tube rotatably coupled to the hinge member.

The clamp includes an attachment member, which may have an upper arm, a lower arm, and a securing element. The lower arm may be parallel to the upper arm, and the securing element may be disposed on either the upper arm or the lower arm. The attachment member may be sized to fit a free end of a fingerboard of a stringed instrument.

In some embodiments, the securing element includes a fastener extending through the upper arm or the lower arm. In other embodiments, the securing element includes a compliant component, such as a spring.

The post may include an upper end and a boss with the boss disposed near the upper end and having a pivot. The pivot may pivotably connected to the hinge member.

The guide tube has a central axis, an outer surface, and an inside diameter. The inside diameter may be sized to fit a stick of a string instrument bow disposed parallel to the central axis. The inside diameter may be between about 0.2 inch and about 1 inch. The guide tube may include a brass tube having a wall thickness between about 0.01 inch and 0.10 inch. In some embodiments, the guide tube has a non-abrasive coating on the inside diameter to prevent damage to a bow during use.

The guide tube also has an axle disposed perpendicularly to the central axis of the guide tube and extending from the outer surface of the guide tube. The hinge member includes a bearing surface sized to receive the axle. In some embodiments, the axle includes an external thread and the bearing surface includes a threaded hole sized to fit the external thread. In other embodiments, the bearing surface may be a bearing (such as a ball bearing or bushing) fastened to the axle to permit free rotation of the axle with respect to the hinge member.

The guide tube may open to more easily insert a bow. In such embodiments the guide tube includes a base and a lid that fit together. The guide tube may have an open configuration with the lid removed from the base and in a closed configuration with the lid attached to the base. When the guide tube is in the open configuration, the opening is large enough to admit the stick.

In embodiments, the invention includes a training device for a bowed string instrument including a clamp for attaching the device to a bowed string instrument, a hinge, and a guide tube. The hinge coupled to the clamp and constrained to pivot with respect to the clamp about a hinge axis. The guide tube is rotatably connected to the hinge and constrained to rotate about a tube axis perpendicular to the hinge axis. The clamp, the hinge, and the guide tube are sized to bring a bow into contact with a string of the stringed instrument when a stick of the bow is disposed in the guide tube and when the clamp is attached to the bowed string instrument. The clamp may include an attachment surface and a post extending vertically from the attachment surface, the hinge disposed on the post distal to the attachment surface and constrained to pivot in a vertical plane. The clamp may be sized to fit a free end of a fingerboard of a stringed instrument.

The invention also includes a method of training a student to play a bowed string instrument. The method includes steps of attaching any of the devices described to a free end of a fingerboard of a bowed string instrument, inserting a stick of a bow into the guide tube, and bowing the stringed instrument. The post, the hinge member, and the guide tube may be sized to bring a bow hair of the bow into contact with a string of the stringed instrument.

In some embodiments, the guide tube may be opened to permit easy insertion of the stick. In these embodiments, the guide tube includes a base and a lid that fit together and come apart. The step of inserting the stick includes substeps of opening the guide tube, inserting the stick into the base, and closing the guide tube.

DETAILED DESCRIPTION

The invention includes devices and methods.

In embodiments, the device includes a guide, a clamp, and a linkage. The guide supports a bow and constrains its motion while using a bowed string instrument. The device is mounted on an instrument's fingerboard and a bow is inserted inside the bow holder. The device keeps a string bow fixed in a horizontal position limiting its movements in vertical and diagonal directions on the strings.

Figure 1:
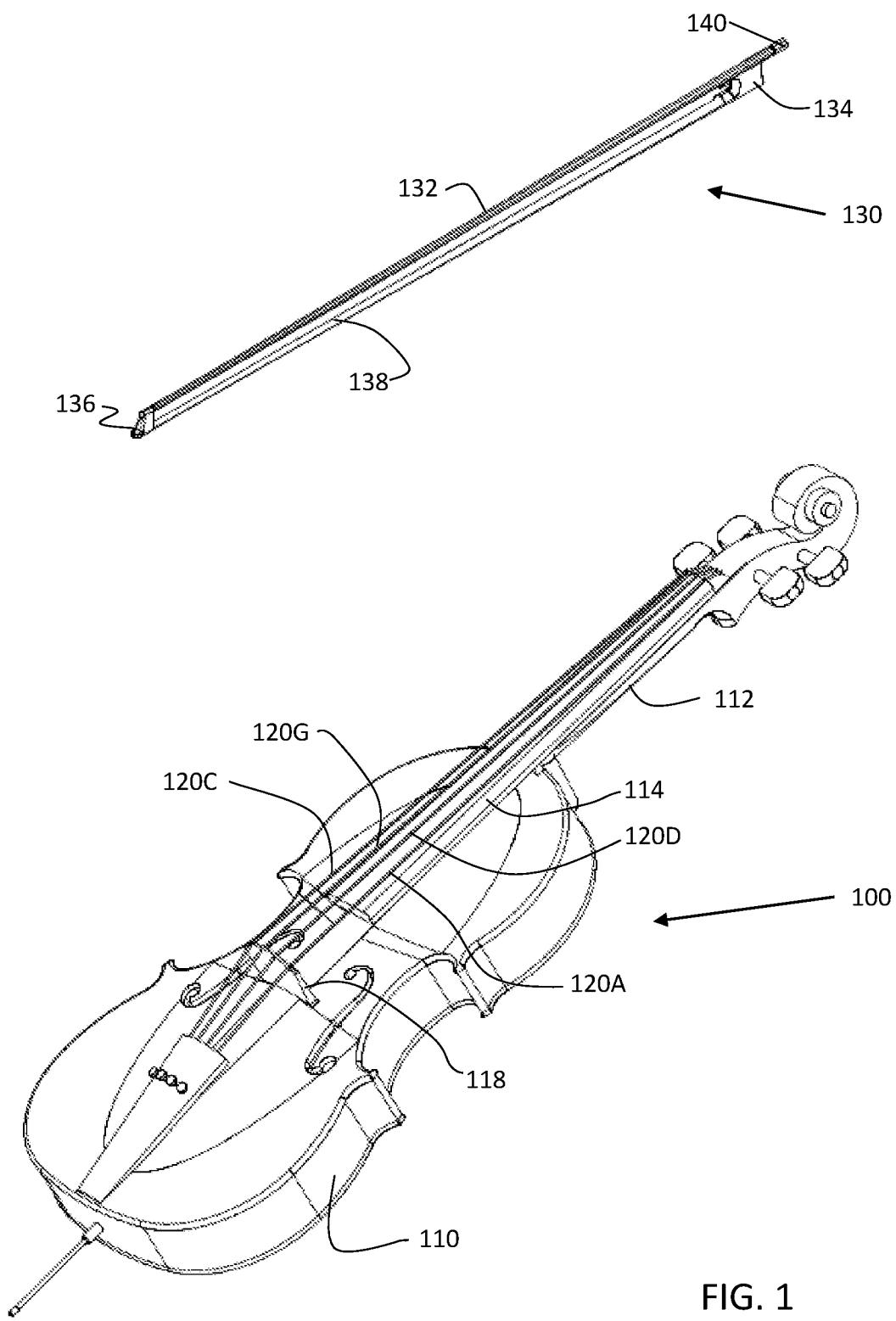
FIG. 1 shows perspective views of a prior art stringed instrument and bow.
Figure 2:
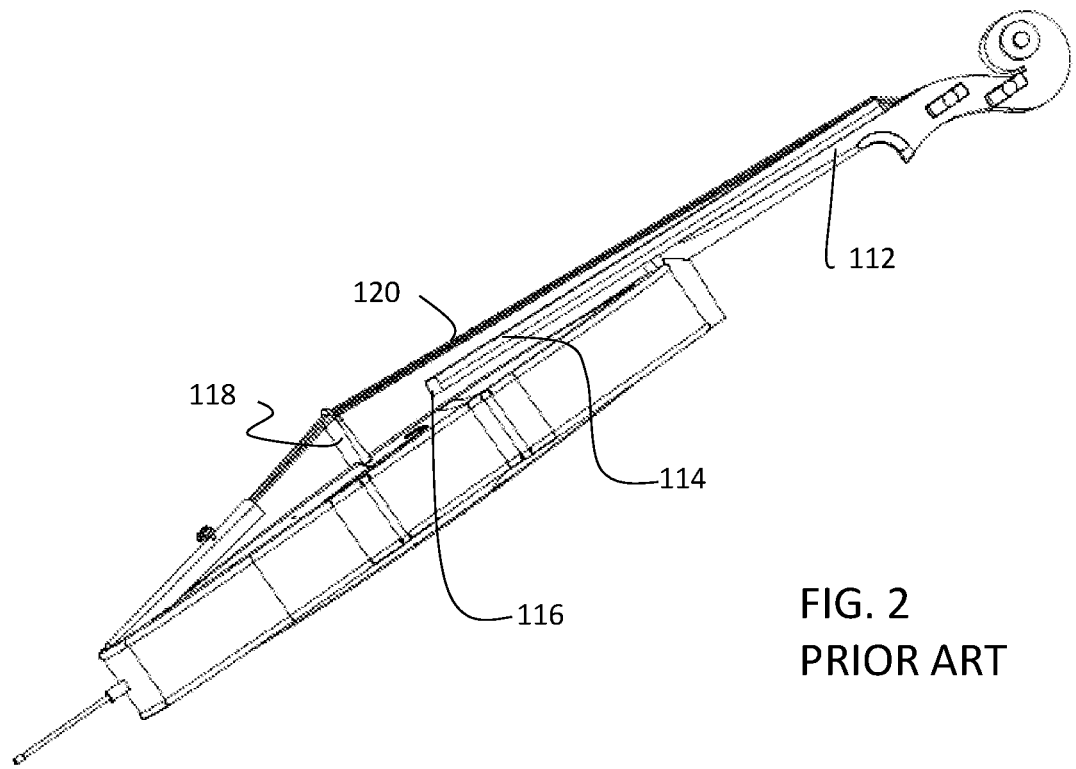
FIG. 2 shows a second perspective view of the stringed instrument of FIG. 1.

Referring to FIGS. 1-2, a traditional bowed string instrument includes an instrument 100 and a bow 130. Instrument 100 includes body 110, neck 112 extending from body 110, fingerboard 114, bridge 118, and strings 120A, 120D, 120G and 120C. Bridge 118 supports strings 120A, 120D, 120G and 120C and is disposed on body 110 at a right angle to the long axis of the instrument defined by neck 112. Fingerboard 114 is attached to neck 112 at one end, but the lower end 116 of fingerboard 114 is cantilevered so that it does not directly contact body 110.

Bow 130 includes elongated stick 132, frog 134, end 136, and hair 138. Hair 138 (typically horsehair in traditional instruments) is held under tension between end 136 and frog 134. Nut 140 allows a user to adjust the tension or to disassemble bow 130 so that stick 132 may be removed from frog 134. As discussed above, the tension may cause curvature of stick 132 so that the distance between stick 132 and hair 138 varies along the length of bow 130.

Movement of hair 138 in contact with any of strings 120A, 120D, 120G and 120C produces vibration of the contacting strings, producing sounds.

Figure 3:
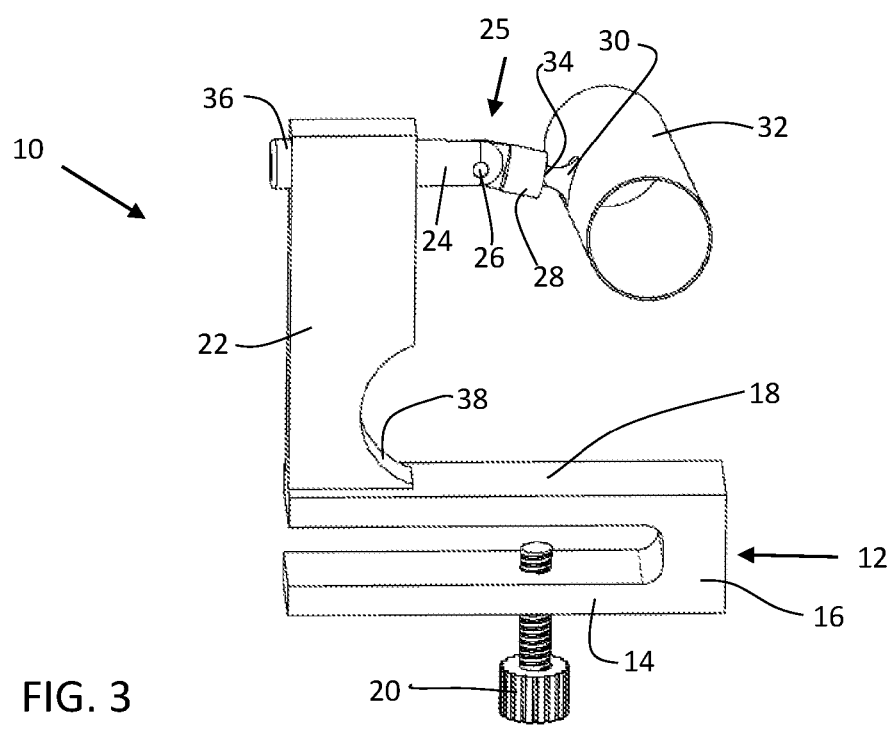
FIG. 3 shows a perspective view of an embodiment of the device of the invention.
Figure 4:
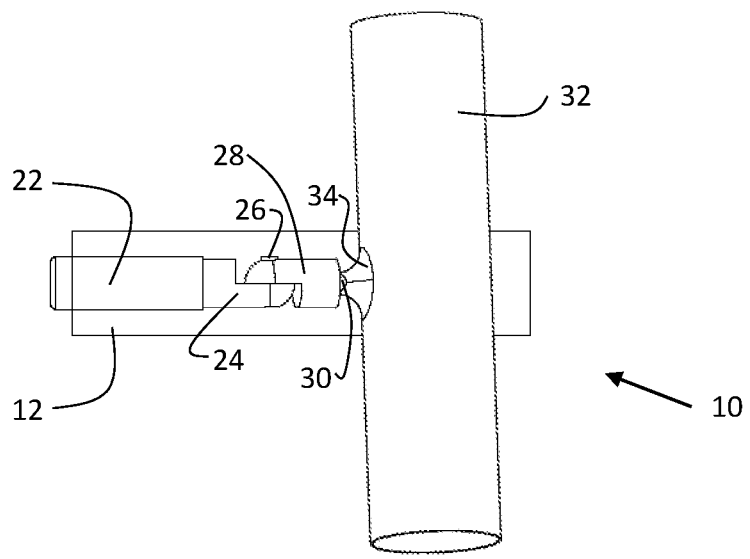
FIG. 4 shows a top view of the device of FIG. 3 with moveable portions in the same position as in FIG. 3.
Figure 5:
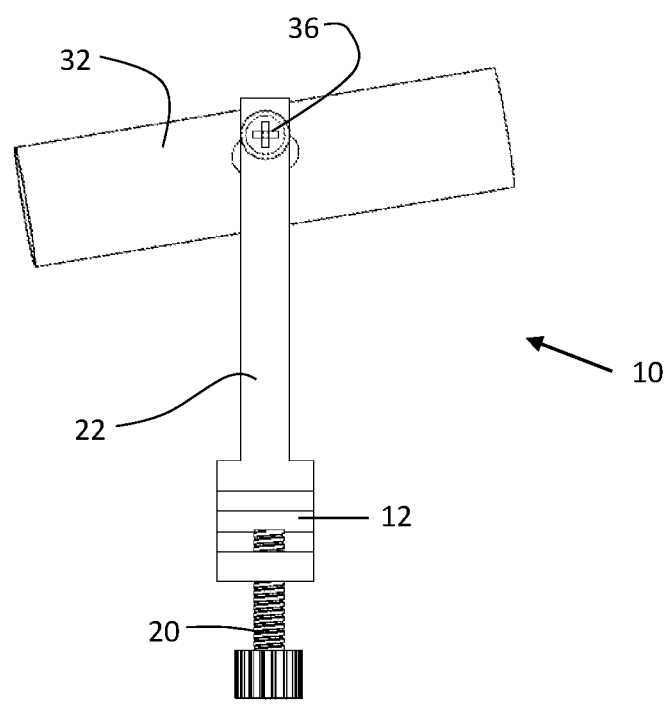
FIG. 5 shows a rear end view of the device of FIG. 3 with moveable portions in the same position as in FIG. 3.
Figure 6A:
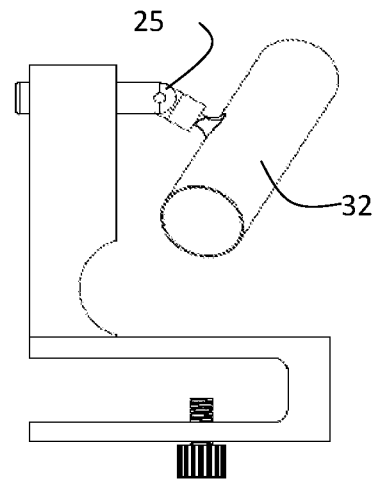
FIGS. 6A, 6B, and 6C show respective side, front end, and top views of the device of FIG. 3 with the hinge directed slightly downward.
Figure 7A:
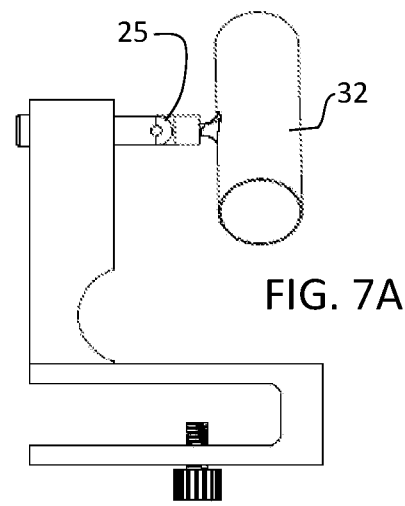
FIGS. 7A, 7B, and 7C show respective side, front end, and top views of the device of FIG. 3 with the hinge directed nearly straight.
Figure 6B:
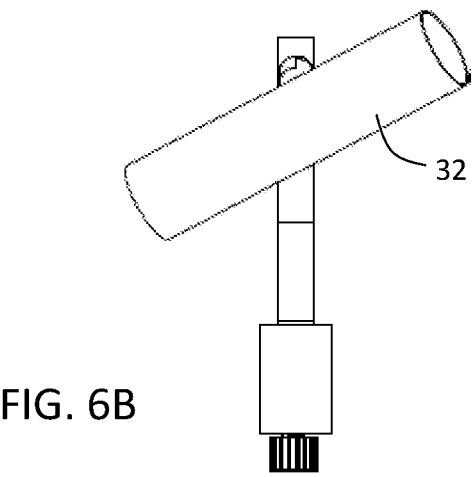
Figure 7B:
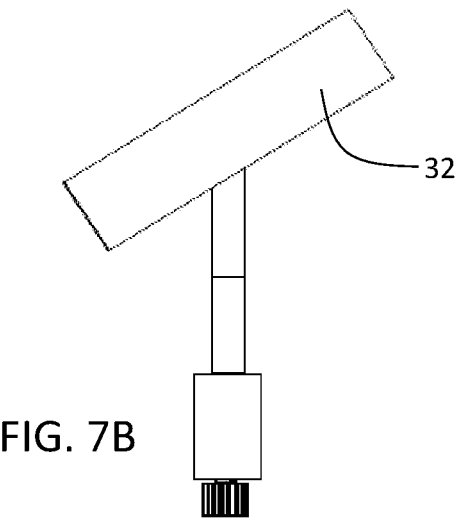
Figure 6C:
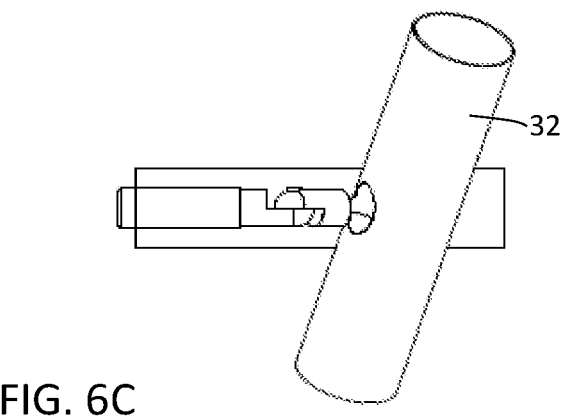
Figure 7C:
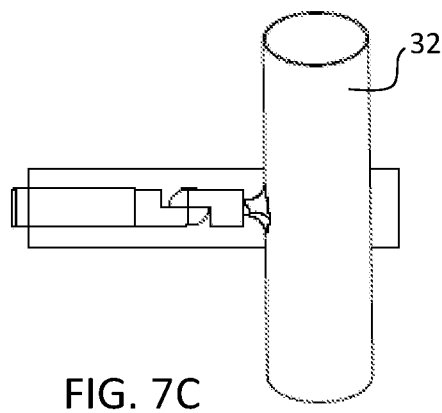

Referring now to FIGS. 3-5, an embodiment of the device 10 of my invention includes clamp 12, post 22, hinge 25, and guide tube 32. Clamp 12 holds device 10 to instrument 100; guide tube 32 supports bow 130 by rotating through a controlled range of angles; hinge 25 adjusts the position of the center of rotation of guide tube 32 to approximate correct bow form; and post 22 raises hinge 25 to a working position above strings 120A, 120D, 120G and 120C.

For orientation reference in this and related embodiments, lower arm 14 forms most of the bottom of device 10, and riser 16 rises vertically from lower arm 14. Riser 16 is at the front end of device 10. The free end of lower arm 14 is at the rear of device 10. The edge of riser 16 shared with the upper face of upper arm 18 is oriented in the side-to-side direction. The U-shaped face of clamp 12 prominently visible near the bottom of FIG. 3 and shared by upper arm 18, riser 16, and lower arm 14 is a side of device 10.

The purpose of clamp 12 is to secure device 10 to instrument 100. In this embodiment, clamp 12 is of generally U-shaped design to fit around the free end 116 of fingerboard 114. Clamp 12 includes lower arm 14, riser 16, and upper arm 18. Clamp screw 20 fits through a threaded hole in lower arm 14. This is particularly appropriate for large instruments such as a cello that have a large clearance between fingerboard 114 and body 110. Smaller instruments, such as a viola, may include clamp screw 20 through another surface, such as through a threaded hole in upper arm 18 (not shown).

The inner surfaces of the U of clamp 12 may contact fingerboard 114. These surfaces may be finely finished or coated to prevent damage to fingerboard 114. In the illustrated embodiment, once clamp 12 is aligned to free end 116 of fingerboard 114, clamp screw 20 may be advanced to fasten to device 10 in place. Clamp screw 20 may be withdrawn by rotating it in the reverse direction so that device 10 may be removed.

In other embodiments, clamp 12 may not include screw 20 and may use some other method to secure clamp 12 to instrument 100. For example, clamp 10 may include compliant components that produce friction between its inner surfaces and fingerboard 114. In some embodiments, the space between upper arm 18 and lower 14 may be tapered to accommodate different thickness fingerboards. In still other embodiments, riser 16 may be replaced by a compliant component, such as an arc spring frequently used in compasses or dividers. Such a spring applies a force that drives upper arm 18 and lower arm 14 together, gripping fingerboard 14. Some embodiments may use combinations of these and other clamping methods.

Post 22 extends vertically from the upper aspect of clamp 12 on the edge away from riser 16. Post 22 is narrow enough to fit between two adjacent strings of instrument 100. The purpose of post 22 is support hinge 25 and guide tube 32 at a height where they may cooperate to guide bow 130 over strings 120A, 120D, 120G and 120C in proper form. Hinge 25 can adjust the height of the center of rotation guide tube 32 to accommodate different sized instruments.

Post 22 may include a lunate cutout 38 to aid in compact storage of device 10. Lunate cutout 38 may approximate the outside diameter of guide tube 32.

Post 22 also includes rigidly mounted boss 24 near the upper end of post 22. Boss 24 extends approximately horizontally toward the front of device 10. Boss 24 may be integrally formed with post 22 or may be separately formed and fastened to post 22, such as by screw 36 penetrating post 22.

Hinge member 28 is an elongated body having a central axis (not illustrated). Hinge member 28 is pivotably connected to boss 24. In the illustrated embodiment, boss 24 and hinge member 28 have complementary flat surfaces and are joined by a pivot pin 26 such that hinge member 28 and boss 24 freely rotate about pivot pin 26. Pivot pin 26 may be rigidly secured into one of the parts and rotatable secured (as by a bearing or by a protruding head) into the other part. Pivot pin 26 is disposed in the side-to-side direction. Hinge member 28, boss 24, and pivot pin 26 cooperate to form hinge 25 that constrains hinge member 28 to pivot upwards or downwards. The central axis and any given point of hinge member 28 moves in a plane parallel to a side of device 10.

The purpose of the hinge 25 is to allow raising or lowering of the center of rotation of guide tube 32. This is necessary so that guide tube 32 can correctly position a bow so that the hair is consistently held in the proper position on the strings. Thus, guide tube 32 can rotate around its axle and go up and down adjusting to the height of the strings and differences of the height of a bow.

Hinge member 28 includes an axially disposed hole 34 on the opposite end of hinge member 28 from pivot pin. Hole 34 includes a bearing surface that supports guide tube 32.

Guide tube 32 is a thin-walled tube, which may be fabricated of a light, yet strong material such as brass or fiber-reinforced phenolic. The inside diameter 50 of guide tube 32 is designed to allow free sliding of stick 132 of bow 130 through guide tube 32. An appropriate size for the inside diameter 50 of guide tube 32 is between about 0.2 inch and about 1 inch, depending on the size of the bow. The inside diameter of guide tube may be polished or coated with a low abrasion material to avoid damage to bow 130 during use. For example, the inside diameter 50 may be coated with smooth plastic or fabric. An appropriate size for the wall thickness of guide tube 32 is between about 0.01 inch and about 0.10 inch. Thinner material is preferred to reduce the effect of guide tube inertia on bowing. However larger bows may require the strength of a thicker material.

Guide tube 32 includes axle 38 (visible in the embodiment FIG. 10) that projects from the outer diameter of guide tube 32 along an extension of a radius of guide tube 32. Axle 38 may be coupled to guide tube 32 through connection 30. Connection 30 may include a machined fitting or may comprise welding, soldering, brazing, riveting, or adhesives to connect axle 30 to the outer surface of guide tube 32.

Axle 38 includes a surface complementary to the bearing surface of hole 34 on hinge member 28. In some embodiments, hole 34 includes an internal thread. In such embodiments, Axle 38 includes a complementary external thread so that guide tube 32 may be simply assembled to device 10 by screwing axle 38 into hole 34. In such embodiments, rotation of guide tube 32 is accompanied by movement of guide tube 32 towards or away form pivot pin 26. Because guide tube 32 never rotates more than one full turn when in use for practice, this movement may be negligible, especially if high pitch threads are used. In other embodiments, hole 34 may include a cylindrical bearing surface such as a ball bearing or a bushing. When a ball bearing is used, the inner race may be press fit to or adhered to axle 38. Other bearing and axle designs that are useful are well known in the art.

In some embodiments, bow 130 may be disassembled by loosening nut 140 and separating stick 132 from frog 134. Stick 132 may then inserted through guide tube 32 and bow 130 reassembled.

Figure 10:
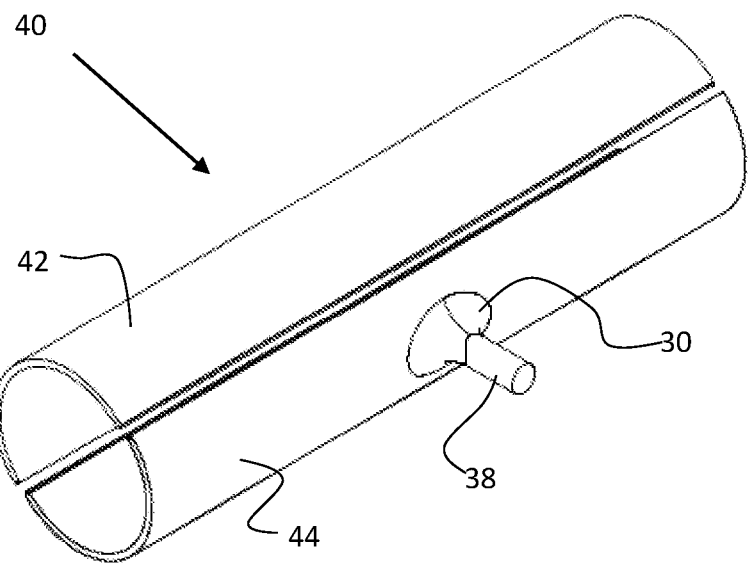
FIG. 10 shows a perspective view of an embodiment of a guide tube.
Figure 11:
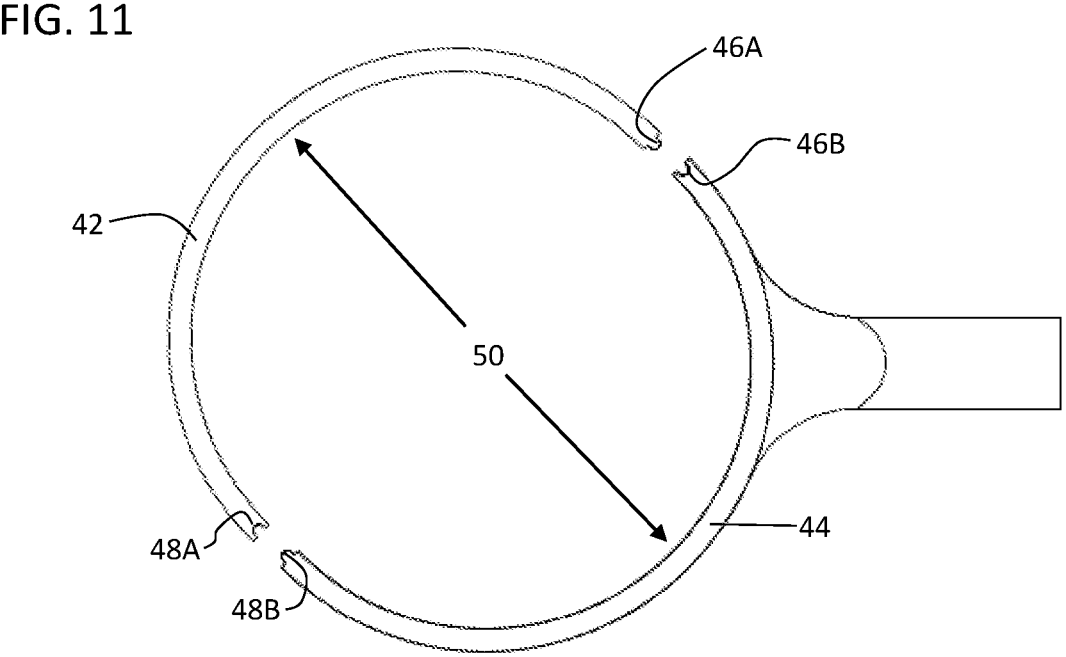
FIG. 11 shows an enlarged end view of the guide tube of FIG. 10

In other embodiments, guide tube 32 may be split into two or more pieces such as the embodiment illustrated in FIGS. 10-11. In this embodiment, guide base 44 and guide cover 42 each include about half of a cylindrical tube. Guide base 44 includes axle 38 and connection 30. The long edges of guide base 44 and guide cover 42 include complementary assembly features 48A, 48B and 46A, 46B. These assembly features align and hold together guide base 44 and guide cover 42 when engaged. In some embodiments, the assembly features may snap the full guide tube together. In such embodiment, the student removes guide cover 42 from guide base 44 disposing the guide tube in the open configuration, inserts stick 132 into guide base 44, and replaces guide cover 42 disposing the guide tube in the closed configuration.

In other embodiments, the assembly features serve to align guide base 44 and guide cover 42, which may then be held by one or more elastic bands during use. In still other embodiments, a base guide and base cover may be hinged together as described in Xiao U.S. Pat. No. 5,670,727.

FIGS. 6A-6C and 7A-7C illustrate some of the controlled positions of guide tube 32 afforded by the device. Each of the view of FIG. 6 show hinge 25 and guide tube 32 in the same position. The views of FIG. 7 are similar, but hinge 25 is disposed downwardly in FIG. 6 and nearly straight in FIG. 7. Guide tube 32 is in the same position with respect to hinge member 28 in all views. As can be seen from the set of views, changing the angle of hinge 25 can have a profound effect on the direction of guide tube 32 and hence of a bow stick extending through guide tube 32. These positions are not reachable without hinge 25. The additional adjustability provided by the combination of hinge 25 constrained to motion in a vertical plane with the free rotation of guide tube 32 advantageously makes possible a full range of positions for proper bowing form, yet still limits bow position to avoid incorrect form.

Figures 8, 8X:
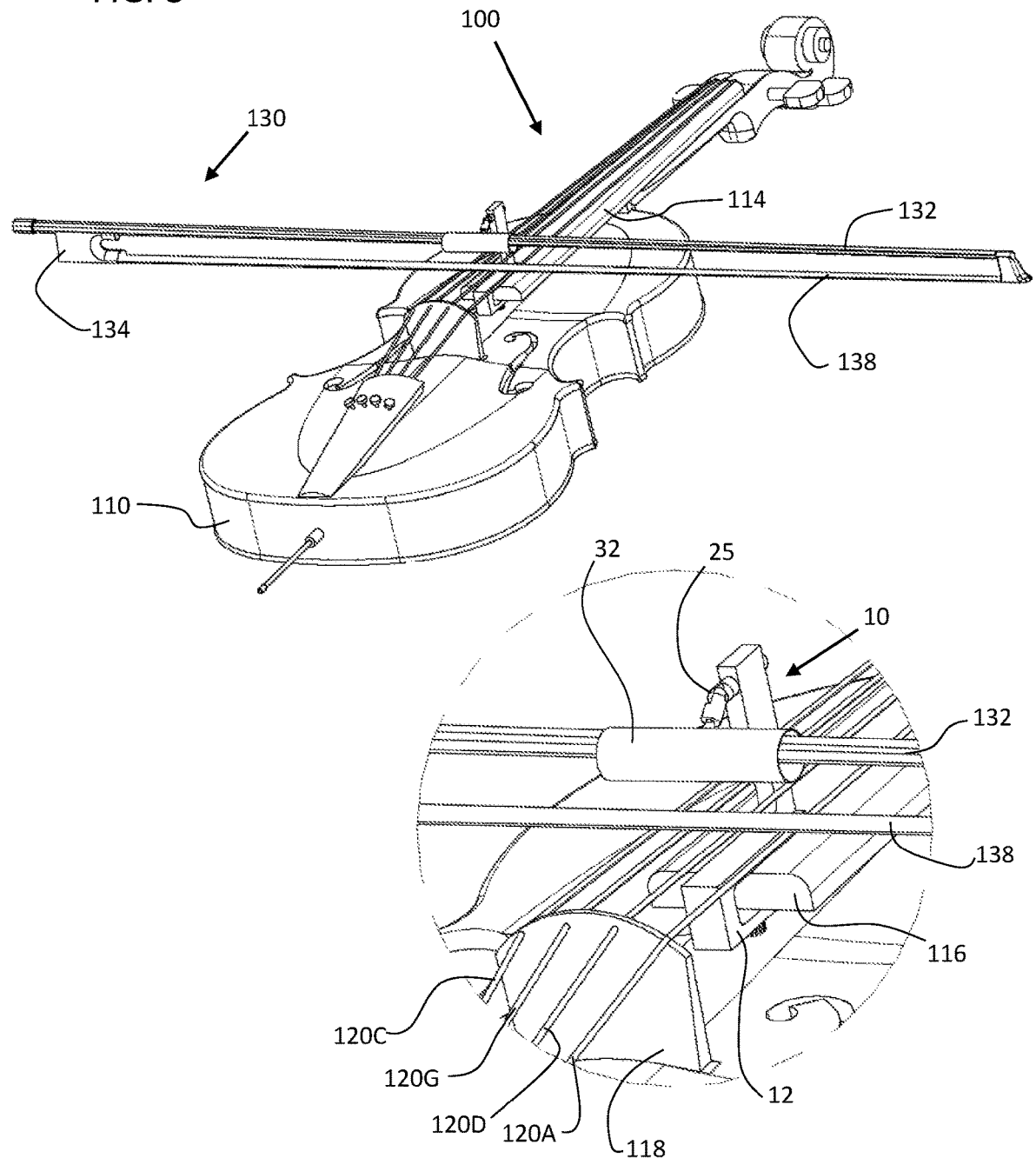
FIG. 8 shows a perspective view of an embodiment of the invention mounted to a stringed instrument and engaged with a bow.
FIG. 8X shows an expanded detail of the central area of FIG. 8 to more clearly show relationships.
Figure 9:
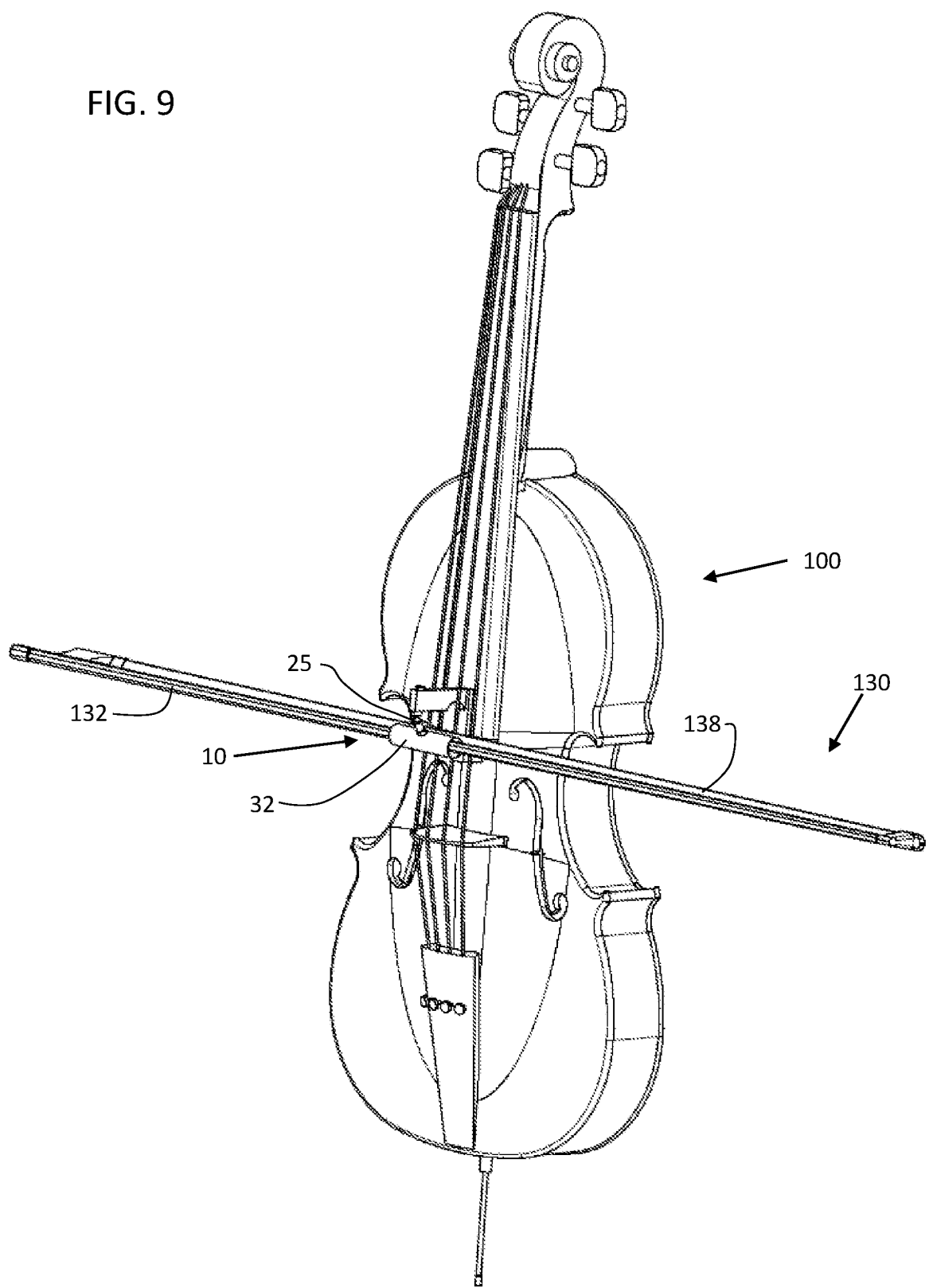
FIG. 9 shows a second perspective view of the embodiment of FIG. 8.

FIGS. 8, 8X, and 9 show device 10 attached to instrument 100 with stick 132 of bow 130 inserted through guide tube 32. Clamp 12 is affixed to free end 116 of fingerboard 114. Hair 138 is disposed parallel to bridge 118 in contact with string 120D. Hinge 25 is disposed slightly downwardly.

Post 22 extends between strings 120G and 120D to dispose hinge 25 and guide tube 32 above the strings. The height of post 22 (at the point of attachment of hinge 25) and the length of boss 24 and hinge member 28 may be adjusted for different sized instruments. The pivoting of hinge 25 itself provides a substantial degree of adjustment.

To use device 10 to develop good bowing form through practice, a student attaches device 10 to free end 116 of fingerboard 114 and inserts stick 132 inside guide tube 32 as described above. Student then bows the instrument. Because stick 132 is placed inside guide tube 32, it guides the bow moving in a very particular and controlled way: it simultaneously controls up/down, back/forth movements and the angle of the bow placement on the string. The device guides the student to hold the bow on the string without lifting it up. When in use, the device guides a student's body to seamlessly learn very complex series of movements required for a proper bow arm technique. The bow remains at the same point of the string; it does not move even by a few millimeters up or down. If a student tries to push the bow a different way, the sound will either get screechy or stop entirely, providing immediate feedback. A common struggle for students while developing bow arm technique is not to hold the bow in the air and let it sit on the string. Device 10 addresses that issue: if the student tries to lift the bow in the air, the device will not allow to quickly place it back. The sound will stop, quickly drawing the student's attention to the problem.

Device 10 may also be used in other applications where there is need of skill of pulling an object back and forth horizontally to create a muscle memory associated with this movement.

This specification discloses various aspects of the invention with reference to particular embodiments, but it should be understood that any of the features, functions, materials, or characteristics may be combined with any other of the described features, functions, materials, or characteristics. The description of particular features, functions, materials, or characteristics in connection with a particular embodiment is exemplary only; it should be understood that it is within the knowledge of one skilled in the art to include such feature, structure, or characteristic in connection with other embodiments whether or not explicitly described. I intend the scope of the appended claims to encompass such alternative embodiments. Variations on these described embodiments will become apparent to those of ordinary skill in the art upon reading the description. The inventor expects skilled artisans to employ such variations as appropriate, and the inventor intends for the invention to be practiced otherwise than specifically described herein. Accordingly, this specification and claims include all modifications and equivalents of the subject matter recited in the claims appended hereto as permitted by applicable law. Further, where specific examples are given, the skilled practitioner may understand the particular examples as providing particular benefits such that the invention as illustratively disclosed herein suitably may be practiced in the absence of any element which is not specifically disclosed herein or within that particular example.

Unless otherwise indicated, all numbers used in the specification and claims are to be understood as being modified in all instances by the term "about." Unless indicated to the contrary, the numerical values in the specification and attached claims are approximations that may vary depending upon the desired properties sought to be obtained.

The terms "a," "an," "the" and similar referents used in the context of describing the invention (especially in the context of the following claims) are intended to cover both the singular and the plural, unless otherwise indicated herein or clearly contradicted by context. All methods described herein can be performed in any suitable order unless otherwise indicated herein or otherwise clearly contradicted by context. The use of any and all examples or exemplary language (e.g., "such as") provided herein is intended merely to better illuminate the invention and does not pose a limitation on the scope of the claims. No language in the specification should be construed as indicating any non-claimed element essential to the practice of the invention.

This application refers to published patent reference documents including U.S. Pat. No. 2,782,670 to Lipski and U.S. Pat. No. 5,670,727 to Xiao. These documents are hereby incorporated by reference. In the event of any conflict between the teachings of these documents and the balance of this application, this application shall control.

I claim:

1. A device comprising:
   a clamp having an upper surface;
   an elongated post extending upward from the upper surface;
   a hinge member pivotably connected to the post; and
   a guide tube rotatably coupled to the hinge member, the guide tube configured to allow free sliding of a stick of a bow therethrough.

2. The device of claim 1, wherein the clamp includes an attachment member.

3. The device of claim 2, the attachment member having an upper arm, a lower arm, and a securing element, the lower arm parallel to the upper arm, and the securing element disposed on the upper arm or the lower arm.

4. The device of claim 3, wherein the attachment member is sized to fit a free end of a fingerboard of a stringed instrument.

5. The device of claim 4, wherein the securing element includes a fastener extending through the upper arm or the lower arm.

6. The device of claim 4, wherein the securing element includes a compliant component.

7. The device of claim 2, wherein the post includes an upper end and a boss, the boss disposed near the upper end and having a pivot, the pivot pivotably connected to the hinge member.

8. The device of claim 1, wherein the guide tube has a central axis, an outer surface, and an inside diameter, the inside diameter sized to fit a stick of a bowed string instrument bow disposed parallel to the central axis.

9. The device of claim 8, wherein the inside diameter is between about 0.2 inch and about 1 inch.

10. The device of claim 8, wherein the guide tube includes a brass tube having a wall thickness between about 0.01 inch and 0.10 inch.

11. The device of claim 8, wherein the guide tube has a non-abrasive coating on the inside diameter.

12. The device of claim 8, wherein the guide tube further includes an axle, the axle disposed perpendicularly to the central axis and extending from the outer surface of the guide tube, and wherein the hinge member includes a bearing surface sized to receive the axle.

13. The device of claim 12, wherein the axle includes an external thread and the bearing surface includes a threaded hole sized to fit the external thread.

14. The device of claim 12, wherein the bearing surface comprises a bearing fastened to the axle to permit free rotation of the axle with respect to the hinge member.

15. The device of claim 8, wherein the guide tube includes a base and a lid, the guide tube disposable in an open configuration with the lid removed from the base and in a closed configuration with the lid attached to the base, the open configuration sized to admit the stick.

16. A training device for a bowed string instrument comprising:
   a clamp for attaching the device to a bowed string instrument;
   a hinge coupled to the clamp and constrained to pivot with respect to the clamp about a hinge axis;
   a guide tube rotatably connected to the hinge and constrained to rotate about a tube axis perpendicular to the hinge axis,
   wherein the clamp, the hinge, and the guide tube are sized to bring a bow into contact with a string of the stringed instrument when a stick of the bow is disposed in the guide tube and when the clamp is attached to the bowed string instrument.

17. The device of claim 16, wherein the clamp includes an attachment surface and a post extending vertically from the attachment surface, the hinge disposed on the post distal to the attachment surface and constrained to pivot in a vertical plane.

18. The device of claim 16, wherein the clamp is sized to fit a free end of a fingerboard of a stringed instrument.

19. A method of training a student to play a bowed string instrument, the method comprising:
   attaching the device of claim 1 to a free end of a fingerboard of a bowed string instrument;
   inserting a stick of a bow into the guide tube; and
   bowing the bowed stringed instrument,
   wherein the post, the hinge member, and the guide tube are sized to bring a bow hair of the bow into contact with a string of the bowed stringed instrument.

20. The method of claim 16, wherein the guide tube includes a base and a lid, the guide tube disposable in an open configuration with the lid removed from the base and in a closed configuration with the lid attached to the base, the open configuration sized to admit the stick, wherein the step of inserting the stick includes:
   disposing the guide tube in the open configuration;
   inserting the stick into the base; and
   disposing the guide tube in the closed configuration.

* * * * *